Jan. 20, 1970 G. H. FRIELING, JR 3,490,125
CORROSION RESISTANT WIRE AND THE LIKE
Original Filed June 17, 1964

Inventor,
Gerald H. Frieling, Jr.,
by Edward J. Connors Jr.
Att'y.

United States Patent Office 3,490,125
Patented Jan. 20, 1970

3,490,125
CORROSION RESISTANT WIRE AND THE LIKE
Gerald H. Frieling, Jr., Barrington, R.I., assignor to Texas Instruments Incorporated, Dallas, Tex., a corporation of Delaware
Continuation of application Ser. No. 375,848, June 17, 1964. This application Apr. 11, 1968, Ser. No. 720,740
Int. Cl. B21f *19/00;* B21c *37/04;* B23p *3/00*
U.S. Cl. 29—191.6                                              4 Claims

ABSTRACT OF THE DISCLOSURE

A stainless steel wire strand core having substantial inherent resistance to corrosion in sea water is used in work-hardened condition to provide the core with very high tensile strength, the core being clad with a layer of cupronickel solid-phase metallurgically bonded to the core to facilitate drawing of the core, to protect the core against fouling with organic growth in sea water, to protect the core against abrasions, and to protect the core against stress corrosion cracking and crevice corrosion. The cupronickel cladding material occupies a higher and more active position in the galvanic series of metals and alloys than the material of the core to assure that any galvanic action to which the strand is exposed will corrode the cladding material in preference to the core material, thereby protecting the core which provides the major portion of the tensile strength of the wire strand.

---

This is a continuation of application Ser. No. 375,848, filed June 17, 1964, now abandoned.

This invention relates to a corrosion resistant wire-like strand construction and to a method of making such strand which strand is suitable for applications in sea water or other corrosive atmosphere and for applications either as a single strand or in cable or wire rope form.

It is an object of the instant invention to provide a wire-like strand or cable formed from such strand which has a high degree of corrosion resistance in oceanic or other corrosive atmosphere, which has a high strength to weight ratio, which, in addition, possesses resistance to fouling or the growth of organisms on the surface, which is resistant to fishbite, which possesses good fatigue strength, and which is particularly adapted for undersea or other corrosive atmosphere applications such as oceanic cables, tow line, buoy cable, armoring for electrical cable and the like.

Other objects will be in part apparent and in part pointed out hereinafter.

The invention accordingly comprises the elements and combinations of elements, steps and sequences of steps, features of construction and manipulation and arrangements of parts, all of which will be exemplified in the structures and methods hereinafter described and the scope of the application of which will be indicated in the appended claims.

Figure 1:
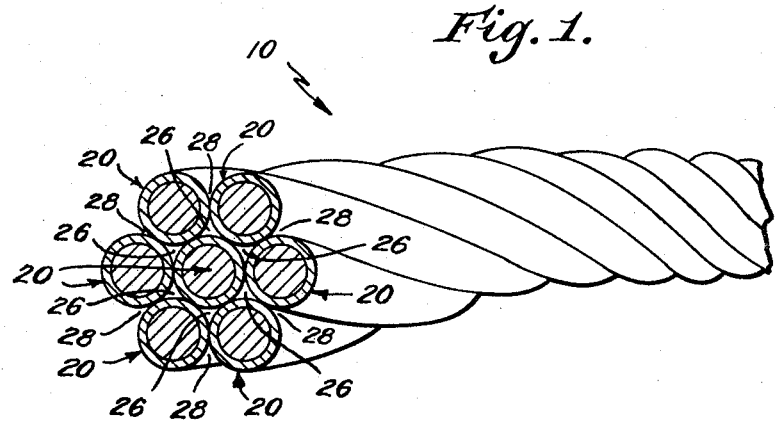
Figure 2:
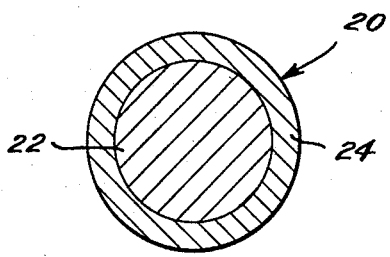

In the accompanying drawings in which one of the various possible embodiments of the invention is illustrated:

FIG. 1 is a perspective view of a cable or wire rope according to this invention; and FIG. 2 is an enlarged, detailed, cross section of a strand according to the invention.

Similar reference characters indicate corresponding parts throughout the several views of the drawings.

Dimensions of certain of the parts as shown in the accompanying drawings have been modified for the purposes of clarity of illustration.

Corrosion has long been a problem in undersea and other oceanic activities. For example, much undersea activity requires the use of valuable instruments moored or in tow in the sea. Frequently the cables or wire rope used in tow lines to carry such valuable instruments have been victims of corrosion. In addition, such cables are often attacked by excessive wear, fatigue, bending, kinking, fouling by marine growth and even fishbite. To date, no material has provided a completely satisfastory solution to the above problems.

Applicant's studies have revealed that the ideal marine cable should have high corrosion resistance to provide longer service life and to reduce maintenance costs, should have a high strength to weight ratio to permit heavier pay loads at lesser cost, should be resistant to fishbite, should be resistant to fouling, i.e., the growth of organisms on the exterior surfaces of the cable, and should have high fatigue strength to survive the kinking, bending, and other movements to which a cable would be subjected.

Prior attempts to successfully meet all the requirements of an ideal marine cable have included the use of plastics or other synthetic materials as a strand material for cable but these have been found to be too soft for the most part to form the tasks required in undersea cable work. More particularly, such materials have had low resistance to cutting or abrading and have been subject to attack by undersea living matter. Further, such materials have had very little if any antifouling properties and hence, have been subject to organism growth on their exterior surfaces. Such organism growth has made handling of cable extremely difficult and in addition has added a great deal of unnecessary weight to the structure.

Other attempts have included cable made from solid stainless steel wire. This material has a number of disadvantages, one of which is the susceptibility of highly cold worked stainless steel to stress corrosion cracking, that is, to corrosion causing cracking along the boundaries in the granular structure of the stainless steel resulting from the cold work stressing. To reduce this problem, it has been necessary to use the stainless in a partially annealed or stress relieved condition, in which condition is not at its maximum potential strength. In addition, stainless steel is susceptible to crevice corrosion, that is, that corrosion which occurs in the oxygen starved atmospheres found in the cavities between strands in a cable or under an organism growth or fitting.

Other attempts to solve this problem have used galvanized steel, that is, zinc coated steel or aluminum coated steel. However, the zinc (or aluminum) coating has generally been so thin and porous that, as a result, it has provided poor protection against the electrolytic activity of the ocean in undersea application. In addition, zinc and aluminum are highly active materials in the galvanic series.

Applicant has discovered that a bimetal or clad construction for such strand provides an advantageous solution to the above noted problem. More particularly, in applicant's preferred embodiment, the strand is formed by a layer of cupronickel alloy forming a sleeve which surrounds and adheres to a core of stainless steel.

Referring now to the drawings, there is shown in FIG. 1 a cable, or wire rope, generally indicated by reference numeral 10. Cable 10 is formed of a plurality of wire-like strands, generally indicated by reference numeral 20, woven together to form cable 10. As best seen in the drawings, strands 20 are generally circular in cross sectional configuration. However, it will be understood that they may be of any desired configuration in cross section. Each of strands 20 is formed of a core 22 having a generally circular cross sectional configuration and being completely coaxially surrounded by a sleeve 24 having a generally tubular or circular cross sectional configuration.

In the preferred embodiment of applicant's invention, core 22 is formed of a stainless steel while cladding or sleeve 24 is formed of a cupronickel alloy. By way of example, the core 22 has been formed using one of the nonmagnetic stainless steels or a high strength stainless steel or stainless steel 304. By way of example, the sleeve 24 is formed of cupronickel alloys containing from 70–90% copper and 30–10% nickel. It will be understood that other stainless steels and other percentages of cupronickel alloy than those noted above may be used. In addition, cladding 24 may be formed of the nickel base alloy sold under the trademark Hastelloy C containing .15% (max.) carbon, 13–16% chromium, 15–19% molybdenum, 3.5–5.5% tungsten, 4–7% iron and the balance nickel, or titanium, or the precious metals. However, none of these are as economical as the cupronickel alloy. By way of example, other material suitable for use in the core are nickel and Inconel. However, stainless steel provides the highest tensile strength and is, therefore, preferred. The relative thicknesses of the cladding or sleeve and core depends in the balance desired between corrosion protection and strength. The strand 20 is formed as follows: a core material is selected such as, for example, stainless steel 304 in the passive condition, that is, having a chrome oxide film thereon which inhibits further oxidation and which places the stainless steel on a lower and less active position on the galvanic series of metals and alloys.

Thereafter, a cupronickel sleeve is selected and is adhered to the core as, for example, by the solid-phase bonding technique disclosed in U.S. Patent No. 2,753,623 entitled, "Solid-Phase Bonding of Metals," in the name of H. W. Boessenkool, George Durst and Sidney Siegel and assigned to the assignee of the instant invention. Thereafter, the clad rod and the clad rod tubing is cold worked as, for example, by drawing through a die to achieve a reduction, for example, in the neighborhood of 97%. This large reduction without the intermediate annealing step to soften the material provides a strand 20 of great strength and permits the use of the stainless steel to be used in a condition in which its strength exceeds that of a solid stainless steel strand. In addition, since the exterior of the stainless steel is clad, it is not touched by the die and hence deleterious galling of the exterior surface of the stainless steel is avoided.

This construction provides numerous advantages not heretofore available in a strand for cables.

The cupronickel alloy sleeve has a number of advantages. For example, it is relatively low on the galvanic series of metals and alloys and hence is a relatively inactive material in sea water or other corrosive atmosphere and hence it resists corrosion. In sea water or like corrosive atmospheres, the cupronickel alloy experiences substantially no stress corrosion cracking.

In addition the cupronickel alloy possesses strong antifoulant capability in that it gives off cupric ions which are poisonous to living organisms. This prevents the formation of such organisms on the surface of the strands 20 thus permitting easier handling and providing longer life for the cladding. Further, the cupronickel cladding resists accelerated crevice corrosion such as at points 26 and 28 on cable 10.

The stainless steel provides strength for the strand and in addition, provides a degree of corrosion resistance should the cupronickel cladding be broken.

In combination, the cupronickel alloy sleeve and the stainless steel core co-operate to provide a number of advantages. One of these is their galvanic compatibility. The cupronickel alloys, while relatively low on the galvanic series are still above stainless steel on the galvanic series and are more active than the stainless steel core. The result of this is that should there be a break in the cupronickel alloy cladding, the galvanic activity of the juxtaposed cupronickel alloy and stainless steel will be to sacrifice the weaker cupronickel sleeve to the strength providing stainless steel core.

In addition, the composite cupronickel stainless steel provides a strand possessing a fatigue strength which is higher than a solid stainless steel strand of comparable size. This occurs in at least two ways. In the first of these, it has been discovered that when a voltage is impressed upon stainless steel of the kind in which would be experienced in an electrolytic environment such as sea water, its fatigue strength tends to increase. Thus when stainless steel and cupronickel are used in conjunction in an electrolyte such as sea water or other corrosive atmosphere, a voltage is impressed upon the stainless steel which causes a concomitant rise in its fatigue strength. Further, since the stainless steel is clad with cupronickel prior to its reduction or drawing the stainless steel never experiences the galling on its surface caused by passing through a die.

Further the use of the cupronickel alloy in conjunction with the stainless steel improves the corrosion characteristics of the stainless steel itself, first by cathodic protection, i.e., the tendencies of the cupronickel alloy to sacrifice itself to the stainless steel when the cladding is broken. Further, should a break in the sleeve 24 occur, the stainless steel core will immediately revert to its passive, chromium oxide coated condition.

The great reduction permitted under the solid phase bonding process adds strength to the stainless steel. Generally, in the past it has been possible only to reduce the solid stainless steel to approximately 80% of its cross sectional area so as not to raise it to so high a level that the stress corrosion cracking of the stainless steel would become unmanageable. However, since in the instant combination the stainless steel is clad, the strand is capable of a 97% reduction in its cold working without annealing, which provides great strength.

It will be seen that applicant's composite strand advantageously solves the problems noted above.

In view of the above, it will be seen that the several objects of the invention are achieved and other advantageous results are obtained.

As many changes could be made in the above constructions and methods without departing from the scope of the invention, it is intended that all matter contained in the above description or shown in the accompanying drawings shall be interpreted as illustrative and not in a limiting sense, and it is also intended that the appended claims shall cover all such equivalent variations as come within the true spirit and scope of the invention.

It is to be understood that the invention is not limited in its application to the details of construction and arrangement of elements illustrated in the accompanying drawings, since the invention is capable of other embodiments and of being practiced or carried out in various ways. Also, it is to be understood that the phraseology or terminology employed herein is for the purpose of description and not of limitation.

What is claimed is:

1. A strong, corrosion-resistant, composite, wire-like strand formed exclusively of metal, said strand comprising in combination a core of stainless steel and a sleeve formed of an alloy of copper and nickel, said core material being in work-hardened condition having a relatively higher degree of tensile strength than said sleeve material, said sleeve alloy occupying a higher and more active position in the galvanic series of metals and alloys than the material of said core, said sleeve coaxially surrounding and being secured to said core.

2. The invention as set forth in claim 1 wherein said sleeve is solid-phase metallurgically bonded to said core.

3. A strong, corrosion-resistant, composite, wire-like strand as set forth in claim 1 wherein the work-hardened condition of said core corresponds to a 97% drawing reduction in the cross-sectional size of said core without annealing of said core.

4. A cable suitable for use in sea water formed of a plurality of wire-like strands as set forth in claim 3.

References Cited

UNITED STATES PATENTS

| | | |
|---|---|---|
| Re. 25,043 | 9/1961 | Bulow. |
| 3,328,140 | 6/1967 | Warren _____ 29—191.6 |
| 2,514,873 | 7/1950 | Keene et al. |

L. DEWAYNE RUTLEDGE, Primary Examiner

E. L. WEISE, Assistant Examiner

U.S. Cl. X.R.

29—196.3, 196.6